Figure 1:
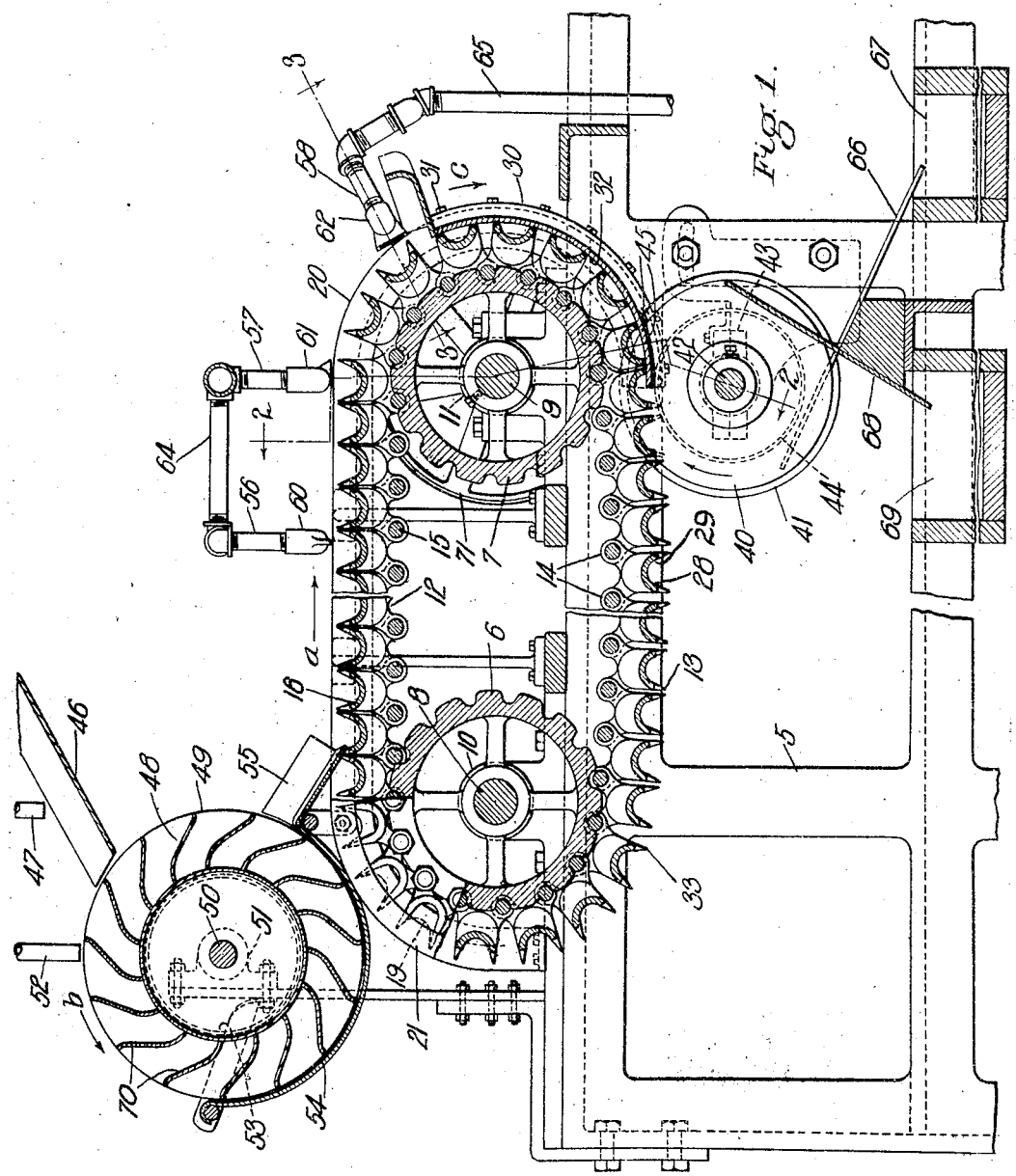

F. D. CLEVELAND.
FISH CUTTING MACHINE, ENDLESS CHAIN CONVEYER.
APPLICATION FILED APR. 23, 1913.
1,125,654.
Patented Jan. 19, 1915.
2 SHEETS—SHEET 2.
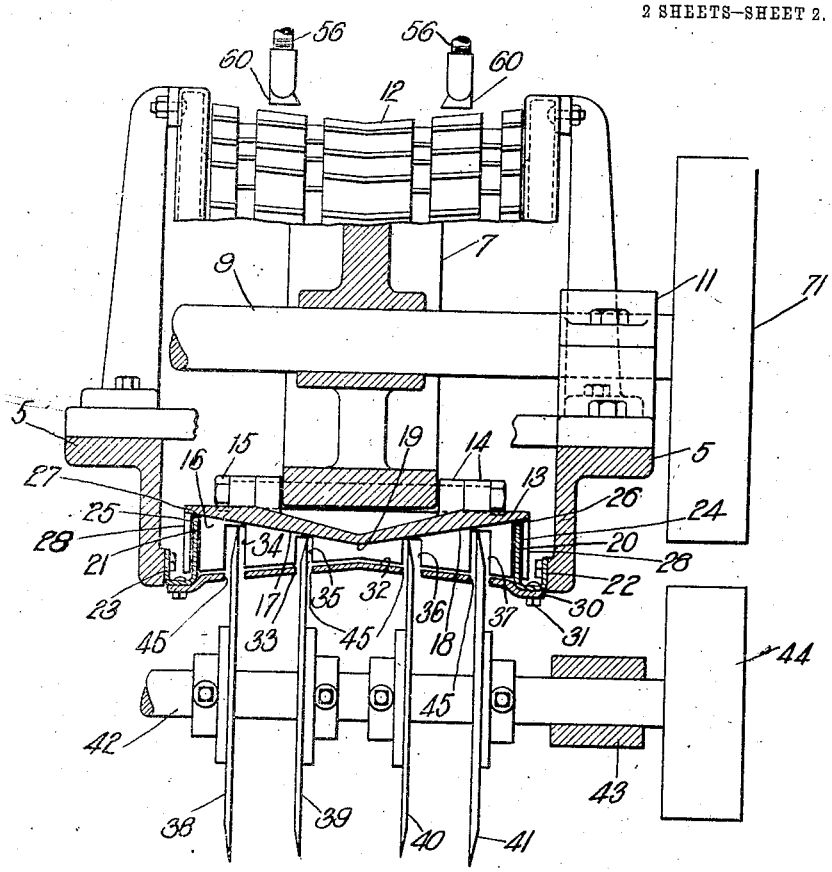
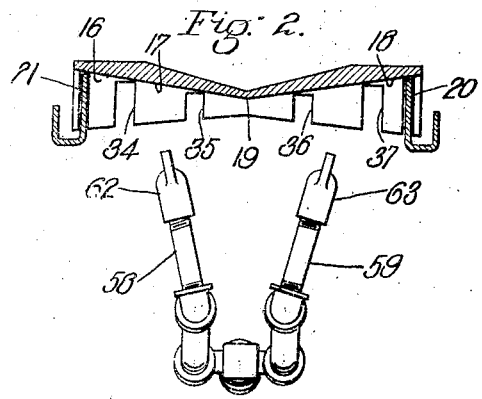
Fig. 2.
Fig. 3.
Witnesses:
Leonard A. Powell
Franklin E. Low
Inventor:
Francis D. Cleveland
by his attorney, Charles N. Gooding

UNITED STATES PATENT OFFICE.

FRANCIS D. CLEVELAND, OF WINCHESTER, MASSACHUSETTS, ASSIGNOR TO WILLIAM UNDERWOOD COMPANY, OF BOSTON, MASSACHUSETTS, A CORPORATION OF MASSACHUSETTS.

FISH-CUTTING MACHINE, ENDLESS-CHAIN CONVEYER.

1,125,654.  Specification of Letters Patent.  Patented Jan. 19, 1915.

Application filed April 28, 1913. Serial No. 763,001.

*To all whom it may concern:*

Be it known that I, FRANCIS D. CLEVELAND, a citizen of the United States, residing at Winchester, in the county of Middlesex and State of Massachusetts, have invented new and useful Improvements in Fish-Cutting Machines, Endless-Chain Conveyer, of which the following is a specification.

This invention relates to mechanism for cutting off the heads and tails of fish, the machine of the invention being particularly adapted to cut off the heads and tails of fish known as "sardines," preparatory to canning the same.

The object of the invention is to provide a machine of the character set forth in which an endless chain conveyer is utilized in combination with suitable gages and streams of water directed into pockets on said conveyer to locate the fish with their heads against said gages in position for the heads and tails of the fish to be severed, the heads and tails being separated from the body portion of the fish and conducted to separate receptacles therefor.

The invention consists in the combination and arrangement of parts set forth in the following specification and particularly pointed out in the claim thereof.

Referring to the drawings: Figure 1 is a longitudinal sectional elevation of a machine embodying my invention, the same being broken away to save space in the drawings. Fig. 2 is a sectional elevation taken on line 2—2 of Fig. 1. Fig. 3 is a sectional elevation taken on line 3—3 of Fig. 1.

Like numerals refer to like parts throughout the several views of the drawings.

In the drawings, 5 is the frame of the machine. Sprocket wheels 6 and 7 are fastened to shafts 8 and 9, respectively, which are journaled in suitable bearings 10 and 11 on the frame of the machine. An endless chain conveyer 12 engages the sprockets 6 and 7 and is movable in the direction of the arrow *a* (Fig. 1).

The chain conveyer 12 consists of a plurality of links 13, each of said links being provided with ears 14 and said ears being pivotally connected together by pivotal bolts 15, thus making an endless chain. Each of the links 13 is provided with a pocket 16 which extends transversely of the chain conveyer 12 and of the direction of motion of said conveyer.

The bottoms of the pockets 16 are made convex, one side of the bottom of said pocket being inclined, as at 17, and the other side 18 of the bottom of the pocket being inclined in the opposite direction, the point 19 midway between the ends of said pockets being preferably the highest point, or the point farthest removed from a common plane containing the median axial lines of the sprocket wheels 6 and 7.

Gages 20 and 21 are provided at opposite ends of the pockets 16. These gages are fastened by means of flanges 22 and 23 and suitable bolts to the opposite sides of the frame 5. Said gages are provided with vertical flanges 24 and 25, respectively, which project into slots 26 and 27 provided at opposite ends of the partitions 28 and 29 forming the sides of the pockets 16. These gages are stationary and constitute not only gages to position the fish in said pockets but also perform the function of guides to support and position the upper side of the chain conveyer 12 as the same is moving in the direction of the arrow *a* (Fig. 1).

A semi-circular shield 30 extends part way around and beneath the sprocket wheel 7 (see Fig. 1) and is fastened by bolts 31 to the gages 20 and 21. The shield 30 has a convex inner face 32 while the outer edges 33 of the partitions 28 and 29 are made concave, as seen in Fig. 2, to conform to the convex inner face of the shield 30. The partitions 28 and 29 are provided with slots 34, 35, 36 and 37 into which project rotary disk cutters 38, 39, 40 and 41. These rotary disk cutters are adjustably fastened to a shaft 42 journaled in suitable bearings 43 in the frame of the machine and rotated by means of a suitable pulley 44. It will be seen that each pair of cutters 38 and 39, 40 and 41 project into suitable slots 45 provided in the shield 30 at its lower end.

The fish are delivered to the machine by means of a chute 46 and water is supplied to said chute through a pipe 47. The fish pass down the chute 46 and enter the pockets 48 in the periphery of a rotary feed wheel 49.

Said feed wheel is fastened to a shaft 50 which is rotatably mounted in suitable bearings 51 supported on the frame of the machine and water is delivered into the pockets 48 through a pipe 52. The feed wheel 49 is rotated in the direction of the arrow b by means of a pulley 53 fast to the shaft 50.

A shield 54 located beneath the feed wheel 49 extends part way therearound and is connected at the outlet end thereof by a chute 55 to the periphery of the chain conveyer 12, so that, as hereinafter more fully described, fish can be fed by said feed wheel to said conveyer.

The chain conveyer is moved in the direction of the arrow a by the sprocket wheel 7 which, in turn, is rotated by the shaft 9 to which it is fastened, the shaft 9 having a rotary motion imparted thereto by a pulley 71 fast thereto.

Water is delivered into the pockets of the chain conveyer, for the purpose of moving the fish in said pockets toward opposite ends thereof until their heads rest against the gages 20 and 21, by pipes 56, 57, 58 and 59, said pipes being provided, respectively, with nozzles 60, 61, 62 and 63. These pipes and nozzles are adapted to direct water into the pockets 16 as said pockets are moved past them in the motion of the chain conveyer, and it will be noted that these pipes and their nozzles constitute oppositely disposed means for directing jets of fluid under pressure into said pockets at points between the centers and the extreme ends of said pockets. The pipes 58 and 59, with their nozzles 62 and 63, are located at an angle to each other and to the pockets into which they discharge streams of water and are located between the centers and the extreme ends of said pockets. Water is supplied to the pipes 56 and 57 by a pipe 64 and water is supplied to the pipes 58 and 59 by a pipe 65. After the heads and tails of the fish have been severed from the bodies by the cutters 38 and 39 40 and 41 the bodies of said fish pass down a chute 66 into a receptacle 67, while the heads and tails pass down a chute 68 into a receptacle 69.

The general operation of the mechanism hereinbefore described is as follows: The fish pass down the chute 46 into the pockets 48 on the rotary carrier 49, water being supplied through the pipe 47 to the chute 46 and floating said fish downwardly therein into said pockets. As the fish pass from the chute 46 into the rotary carrier 49 they are guided by the partitions 70 between said pockets 48 to assume a position at right angles to that which they assume in the chute 46—that is, they will extend longitudinally of said pockets and substantially parallel with the shaft 50 of the rotary wheel 49. As the wheel is rotated in the direction of the arrow b the pockets containing the fish pass behind the shield 54 and the fish in said pockets, as the wheel continues to rotate, slide down the partitions 70 and rest on the shield 54 from which they are pushed by the different partitions 70 along said shield until they come to the chute 55 down which they slide into the pockets 16 on the endless chain conveyer 12.

This conveyer is moved in the direction of the arrow a and the convex formation of the pockets 16 causes the fish to slide either toward the gage 20 or the gage 21, according to the direction in which the heads of the fish may be pointed when they are delivered to said pockets. Those fish which have their heads toward the gage 20 will be assisted by the incline 18 and the streams of water from the pipes 56 and 57 and their nozzles 60 and 61 to move in the direction in which their heads are pointed until said heads are in contact with the gage 20, while those fish whose heads are pointed toward the gage 21 when they are delivered to the pockets 16 will be moved by said streams of water and by the inclined surface 17 of the bottoms of the pockets into which they are delivered to move toward the gage 21 until their heads rest against said gage. As the conveyer chain 12 moves in the direction of the arrow a the pockets will, one by one, pass behind the shield 30 and as the chain continues to move in the direction indicated and the sprocket wheel 7 to rotate in the direction of the arrow c (Fig. 1), the fish in the pockets will move downwardly onto the shield 30 and against the convex inner face of said shield and this convex formation of the inner face of the shield will still further assist the fish to be moved outwardly or with their heads against the gages 20 and 21, according to the direction in which the fish are pointed. Having now arrived beneath the sprocket wheel 7 the fish are forced along the shield 30 by the different partitions of the pockets in which they are located until they are brought into contact with the cutters 38 and 39 or the cutters 40 and 41, respectively—that is fish which are located at one side of the convex shield or on the inclined portion at the right of the center as viewed in Fig. 2 will have their heads and tails severed by the cutters 40 and 41, while those fish which a located on the other side of said shield or at the left of Fig. 2 will have their heads and tails severed by the cutters 38 and 39. The heads and tails as they are severed will drop onto the chute 68 and be conveyed thereby to the receptacle 69, while the bodies will drop onto the chute 66 and will be conveyed thereby to the receptacle 67.

It will be seen that if it is desired to cut the heads and tails from large fish, the cutters 38 and 39 may be adjusted away from each other; likewise, the cutters 40 and 41, whereas if smaller fish are to be cut the cutters 38 and 39 are adjusted toward each other and the cutters 40 and 41 are also adjusted toward each other. The slots 34, 35, 36 and 37 in the partitions 28 and 29 are made of sufficient width so that the cutters can be adjusted as set forth.

It will be understood that fish which are delivered into pockets with convex bottoms, as hereinbefore described, having their heads pointed in one direction will naturally tip in the direction in which the head is pointed, as the head end of the fish is the heavier and will thus be aided by the convex bottoms of the pockets, as well as by the streams, to be moved in the direction in which their heads are pointed against the gages 20 and 21, respectively.

Having thus described my invention, what I claim and desire by Letters Patent to secure is:

A series of individual carriers for articles movable in a given direction, each of said carriers having two side partitions forming a pocket extending transversely thereof and of the direction of movement of said carriers, pivots connecting said carriers together, a semi-cylindrical shield arranged with its inner face in close proximity to the outer edges of said partitions and stationary gages with vertical flanges projecting into slots provided at opposite ends of said partitions.

In testimony whereof I have hereunto set my hand in presence of two subscribing witnesses.

FRANCIS D. CLEVELAND.

Witnesses:
SYDNEY E. TAFT,
ANNIE J. DAILEY.